UNITED STATES PATENT OFFICE.

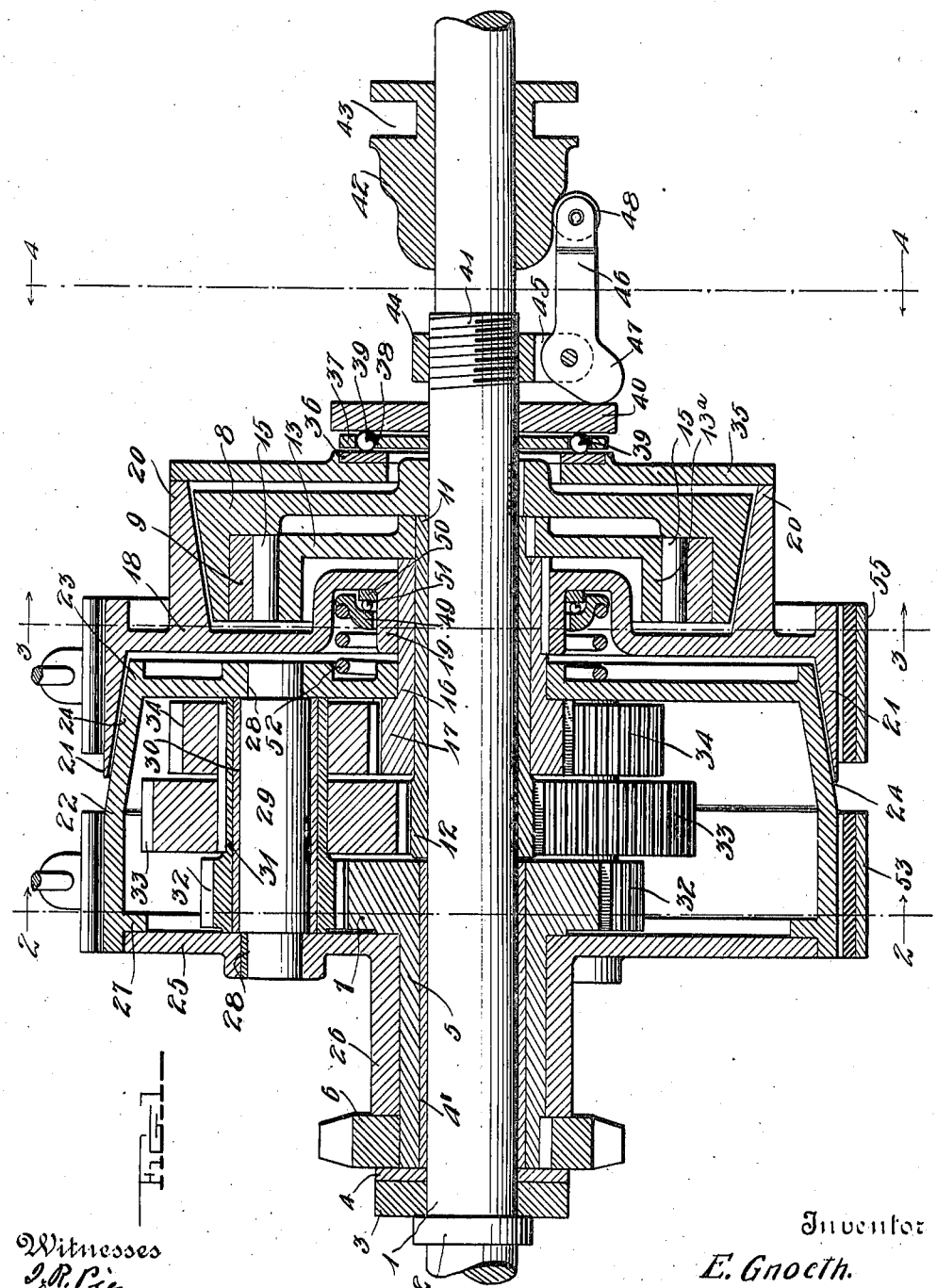

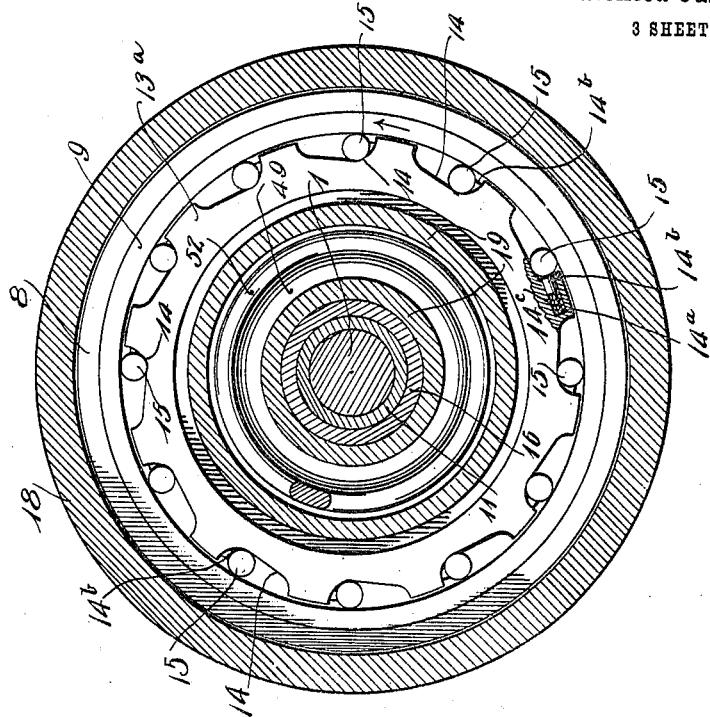
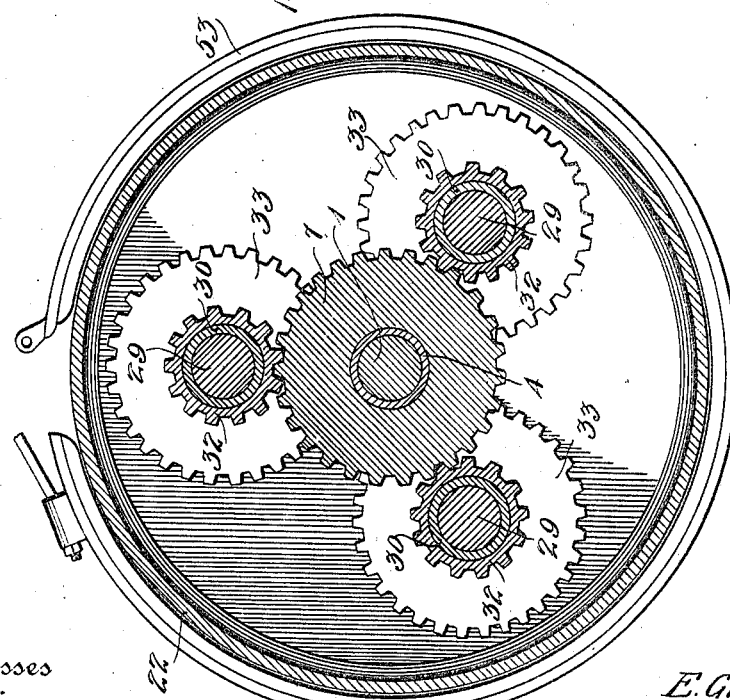

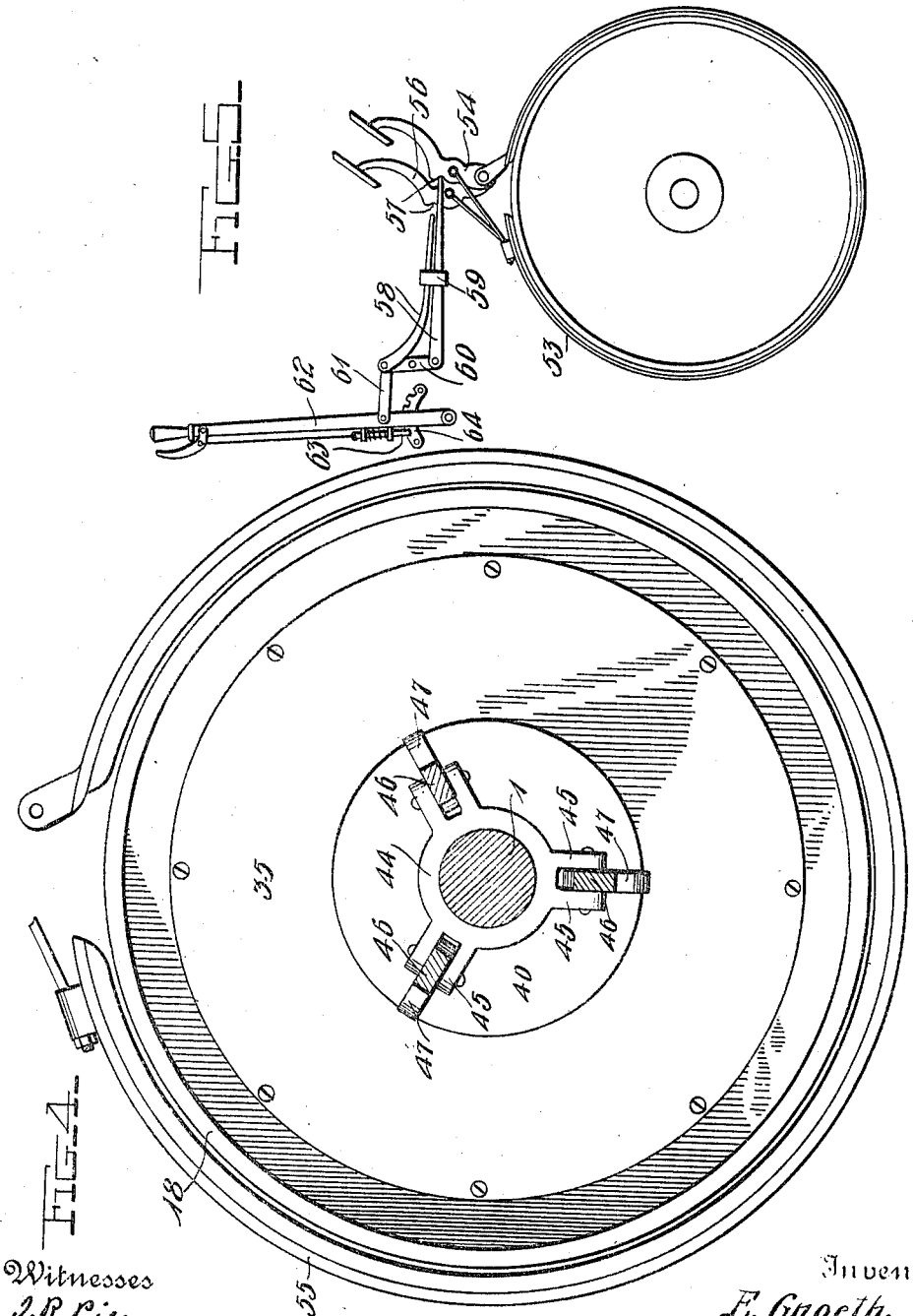

EMIL GNOETH, OF MADISONVILLE, OHIO.

VARIABLE-SPEED PLANETARY GEARING.

1,028,347.  Specification of Letters Patent.  Patented June 4, 1912.

Application filed July 3, 1911. Serial No. 636,586.

*To all whom it may concern:*

Be it known that I, EMIL GNOETH, a citizen of the United States, residing at Madisonville, in the county of Hamilton and State of Ohio, have invented certain new and useful Improvements in Variable-Speed Planetary Gearing; and I do declare the following to be a full, clear, and exact description of the invention, such as will enable others skilled in the art to which it appertains to make and use the same.

This invention relates to improvements in variable speed planetary gearing.

One object of the invention is to provide a gearing of this character having means whereby a high, medium or low speed may be secured in a forward direction and a low speed in a rearward direction.

Another object of the invention is to produce a variable speed gearing of this character which will be simple, strong and durable in construction, efficient and reliable in operation and provided with an improved means for shifting the parts to obtain the various speeds.

With these and other objects in view, the invention consists of certain novel features of construction, and the combination and arrangement of parts as will be more fully described and claimed.

In the accompanying drawings: Figure 1 is a central longitudinal sectional view through my improved gearing showing the parts adjusted for producing a low speed forward and a reverse drive by operating one or the other brake bands thereof; Fig. 2 is a cross sectional view on the line 2—2 of Fig. 1; Fig. 3 is a similar view on the line 3—3 of Fig. 1; Fig. 4 is a similar view on the line 4—4 of Fig. 1; Fig. 5 is a small diagrammatic view showing the arrangement of the clutch locking levers.

Referring more particularly to the drawings, 1 denotes the power shaft having a stop flange 2 with which is engaged a thrust collar 3 arranged on the shaft 1. With the collar 3 is engaged a brass washer 4. On the adjacent end of the shaft 1 is arranged a bushing 4* with which is engaged the driven element which is herein shown as a sleeve 5 the outer end of which is connected in any suitable manner to a gear driven rear axle or any other driven part and is here shown as having keyed thereto a sprocket gear 6. On the inner end of the sleeve 5 is formed a spur gear 7. On the shaft 1 a suitable distance from the gear 7 is keyed a disk 8′ carrying the inner member or cone 8 of a medium speed friction clutch. The clutch member 8 is of hollow construction and has arranged therein and fixedly connected thereto a hardened steel ring 9 which forms the outer member of the low speed clutch.

Loosely mounted on the shaft 1 between the clutch member 8 and the gear 7 is a bearing sleeve 11 to one end of which adjacent the gear 7 is keyed a pinion 12, while to the opposite end of said sleeve is keyed a circular hardened steel plate or disk 13 forming part of the low speed and reverse driving mechanism. The plate 13 is provided on its outer edge with an annular right angularly projecting flange 13ª having formed therein a series of radially disposed notches 14, said notches having their bottom or inner walls beveled or inclined as shown in Fig. 3. In the notches of the flange on the plate 13 are arranged hardened steel rollers 15. The diameter of the rollers 15 is slightly less than the width of the space between the deepest parts of the notches 13ª and the adjacent surface of the ring 9 so that when said rollers are in the deepest part of the notches the clutch members 9 and 13 are disengaged and permitted to operate independently of each other. When the rollers 15 move away from the deepest part of the notches 14 they form a binding engagement between the beveled or inclined inner walls of the notches and the adjacent surface of the ring 9 and thus lock the clutch members and cause the same to move together.

In the deepest end of the notches 14 are formed sockets 14ª in which are arranged roller projecting pins 14ᵇ and pin projecting springs 14ᶜ. The pressure of the springs 14ᶜ is applied to the pins 14ᵇ and the latter thus actuated to force the rollers 15 toward the shallower ends of the notches so that when the clutch member 9 is turned in the direction of the arrow shown in Fig. 3 of the drawings, the rollers will immediately bind and lock the clutch members 9 and 13 together. When, however, the clutch member 9 is driven in the opposite direction the rollers will be forced back into the deepest part of the notches 14 against the pressure of the spring projected pins 14ᵇ thus disengaging the clutch members 9 and 13 to permit the latter to turn independently. By thus constructing and arranging the clutch members 9 and 13 the power of the shaft 1 is applied to obtain either a low speed forward or reverse drive as will be hereinafter more fully described.

On the bearing sleeve 11 is loosely mounted a bearing sleeve 16 having fixed on its end adjacent to the pinion 12 a spur gear pinion 17. Keyed to the opposite end of the sleeve is a circular plate 18 having a hollow hub 19 and having on one side near its outer edge an annular laterally extending flange 20 which forms the outer member of the medium speed clutch and has its inner wall inclined to correspond with the tapered or conical outer surface of the inner clutch member 8 with which said outer clutch member 20 is adapted to be operatively engaged as will be hereinafter more fully described. Formed on the outer edge of the circular plate 18 and projecting in the opposite direction from the flange 20 is an annular laterally projecting flange 21 having an inclined inner wall and which forms the outer member of a high speed clutch hereinafter described.

The planet carrier comprises a cylindrical casing 22 open on its outer end and having its inner end closed by an integral plate 23 provided with central bearing aperture adapted to receive the sleeve 16 on which said casing is revolubly mounted. The end of the casing 22 is closed by a circular bearing plate 25 having a centrally disposed bearing aperture and an elongated hub 26 which is revolubly mounted on the sleeve hereinbefore described. The outer edge of the plate 25 fits into the outer end of the casing 22 and engages an annular rib or flange 27 therein as shown.

Formed in the plates 23 and 25 are alined bearing apertures 28 in which are fixedly mounted a series of short planet-gear supporting shafts 29 provided with bushings 30 on which are revolubly mounted bearing sleeves 31. On the outer ends of the sleeves 31 are pinions 32 which are operatively engaged with the gear 7 on the sleeve 5 of the driven sprocket gear 6. Keyed to the sleeves 31 are spur gears 33 which are operatively engaged with the pinion 12 on the sleeve 11, and other spur gears 34 which are operatively engaged with the pinions 17 on the sleeve 16.

The outer member of the high speed clutch has been heretofore described, as consisting of the internally inclined flange 21 on the plate 18. The casing 22 of the planet carrier is provided with the inner member of this clutch, by making the inner end of said casing tapering or slightly conical as shown at 24 and projecting it within the flange 21.

Secured to the outer edge of the flange 20 is a circular end plate 35 having a centrally disposed opening to receive the hub of the clutch member 8 and having formed around said opening an annular recess in which is seated a hardened steel wear plate 36. Loosely mounted on the shaft 1 adjacent to the plate 36 is a circular ball supporting plate 37 having formed therein near its outer edge an annular series of pockets 38 carrying anti-friction bearing balls 39. The balls 39 bear against the plate 36 and with the opposite sides of the balls is engaged a circular shifting plate 40 which is loosely mounted on the shaft 1.

The outer end of the shaft 1 is slightly reduced and is threaded for a short distance adjacent to the outer side of the plate 40 as shown at 41. Sliding on the reduced end of the shaft is a two-step cone 42 which has formed near its outer end an annular groove 43. Adjustably engaged with the threaded surface 41 of the shaft is a lever supporting collar 44 having formed thereon pairs of radially projecting apertured ears or lugs 45 between which are pivotally mounted clutch shifting levers 46. The levers 46 have on their inner ends cam heads 47 which are engaged with the shifting plate 40. In the outer ends of the levers are revolubly mounted anti-friction rollers 48 which are adapted to be engaged with the stepped surfaces of the clutch shifting cone 42 whereby when said cone is moved inwardly or outwardly the levers 46 will be rocked and the plate 40 thus caused to shift the clutch members to their various positions as will be hereinafter more fully described.

Loosely mounted in the hollow hub 19 is a thrust collar 49 between which and a bearing ring 50 is arranged a series of anti-friction bearing balls 51. With the recessed outer side of the thrust collar 49 is engaged one end of a coiled spring 52 the opposite end of which is engaged with the adjacent side of the plate 23 which carries the inner member 24 of the high speed clutch. By thus arranging the spring 52 it will be seen that the pressure of the same is exerted to force and hold the members of the high speed clutch apart and to force the outer member of the medium speed clutch into engagement with the inner member thereof unless prevented by the clutch operating levers 46.

Arranged around and adapted to be brought into engagement with the outer surface of the casing forming part of the planet carrier is a brake band 53 the ends of which are suitably connected with a pedal 54 arranged as shown in Fig. 5 of the drawing and adapted to be engaged with the outer surface of the high speed clutch flange 21 is a brake band 55 the ends of which are operatively connected with a pedal 56 which is also shown in Fig. 5 of the drawings. The pedals 54 and 56 are provided with operating notches 57 with which are engaged the free ends of push rods 58 which are slidably supported in suitable guides 59 and are connected at their opposite ends to a rock lever 60 pivotally supported between its extremities as shown. This lever in turn is connected in any suitable way, as by a link 61, with a hand lever 62 having a thumb latch 63 moving over a toothed segment 64. This detail of construction permits the operator to move either or both of the pedals with his feet, to apply hand power through the lever 62 to move either but not both of the pedals by hand, and of course to use this hand power to assist the movement of said foot on either pedal; and the catch and toothed segment permits him to lock either pedal (but not both) after it has been so moved. Therefore the operator has every facility for applying either brake by hand or by foot according as the exigencies of the situation may demand.

In the operation of this device to obtain a high speed the lever operating cone is shifted inwardly until the rollers 48 in the outer ends of the shifting levers 46 are in engagement with the outer step or largest diameter of the cone, when the cam heads on the inner ends thereof will engage with the plate 40 and through the bearing balls 39 and end plate 35 the plate 18 is pushed inward until the outer member 21 is brought into operative engagement with the coacting inner member 24 of the high speed clutch. This locks the entire planet carrier to the main shaft 1, whereby the sprocket gear 6 is operated at the same speed as the shaft. To obtain a medium or lesser speed the lever operating cone 42 is shifted outwardly to entirely clear the rollers 48 thus permitting the spring 52 to force the plate 18 outwardly thereby bringing the medium speed clutch flange 20 thereon into operative engagement with the coacting inner medium speed clutch member 8; and the brake band 53 is locked into operative engagement with the planet carrier to hold it against rotation. Thereafter power is communicated from the main shaft 1 through the closed medium clutch, plate 18, its hub 19, sleeve 16, and pinion 17 to the medium-sized planet gears 34, and from the latter to the planet pinions 32. These being in engagement with the gear 7 on the sleeve 5 will drive these parts and thus operate the sprocket gear 6 of the driven member at a medium speed and in the same direction as the shaft 1 is moving. To obtain a low speed in a forward direction the lever operating cone 42 is shifted to a position wherein the rollers of the levers 46 engage the first step or smaller diameter of the cone as shown in Fig. 1. When the levers are in this position they will force the plate 18 back against the pressure of the spring 52 and will hold the same in an intermediate position wherein neither the medium speed clutch member 20 nor the high speed clutch member 21 is in an operative position or in engagement with its respective coacting member; and the brake band 53 again operated to engage and lock the planet carrier against rotation. Thereafter the main shaft through the low speed clutch and the rollers 15 will drive the sleeve 11, pinion 12, and largest of the planet gears 33 so as to rotate the latter and the sleeves 31 on which they are fixed. The sleeves 31 when thus driven will operate the pinions 32 and through the latter will drive the gear 7, sleeve 5 and sprocket gear 6 in the same direction as the shaft 1 but at a much lower speed. The sprocket gear 6 is driven in a reverse direction at a low speed by shifting the parts in the same manner as just described for obtaining a low speed forward movement except that the brake band 55 is operated instead of the brake band 53 and the plate 18 locked against rotation instead of the planet carrier. Thereafter power is communicated from the shaft 1 to the largest planetary gears 33 in the manner just described, but as the planet carrier is now loose and may turn around the shaft all the planets revolve around it while rotating on their own axes, the engagement of the planetary gears 34 with the now fixed pinion 17 causes the planet pinions 32 to rotate the spur gear 7 at a low speed and in a reverse direction in a manner well understood.

The particular object of my invention is the production of a medium speed which is an extra speed in a planetary transmission gearing, without adding any more gears than have been heretofore used in a planetary gearing having only one high speed, one low speed and one reverse, thus obtaining a three speed forward drive and a one speed reverse without requiring any more space or complicating the mechanism. A three speed forward and reverse drive mechanism is particularly advantageous in running a motor vehicle when being driven over a grade or rough road where high speed will not work and low speed is too slow, at which times the medium speed will be found to be very desirable and effective. A three speed forward drive planetary transmission gearing constructed in accordance with my invention will also be found to be much safer for inexperienced operators than the usual three speed sliding or selective type gear, and by providing the hand levers 62 in connection with the pedals 56 for operating the brake bands when running at low or medium speed for a long distance such as going up a long grade the foot may be released from the pedals after the hand lever is locked in position without stopping the motor vehicle.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. In a variable speed planetary gearing, the combination with the power shaft, the driven element having a spur gear, a planet carrier inclosing the latter, a plurality of shafts in the carrier, a set of planet gears on each shaft one of which meshes with said spur gear, an inner sleeve loose on the power shaft and having a pinion meshing with the largest planet gear, and an outer sleeve loose on the inner sleeve and having a pinion meshing with the medium planet gear; of a disk fast on the inner sleeve and having a flange constituting the inner member of the low speed clutch, a disk fast on the power shaft and having a cone constituting the inner member of the medium speed clutch, mechanism within the cone and coacting with said flange to make up the low speed clutch, a plate splined on the outer sleeve and having oppositely projecting flanges, one of which coacts with said cone to make up the medium speed clutch and the other of which forms the outer member of the high speed clutch, the casing of said carrier constituting the inner member of the latter, a brake applicable to said carrier, a brake applicable to said plate, and manually controlled means for adjusting said plate and its flanges so as to engage the two members of the medium speed clutch or those of the high speed clutch, or to simultaneously disengage both.

2. In a variable speed planetary gearing, the combination with the power shaft, the driven element having a spur gear, a planet carrier comprising a casing having a conical portion constituting the inner member of the high speed clutch, a plurality of shafts in the carrier, a set of planet gears on each shaft one of which meshes with said spur gear, an inner sleeve loose on the power shaft and having a pinion meshing with the largest planet gear, and an outer sleeve loose on the inner sleeve and having a pinion meshing with the medium planet gear; of a disk fast on the inner sleeve and having a flange constituting the inner member of the low speed clutch, a disk fast on the power shaft and having a cone constituting the inner member of the medium speed clutch, mechanism within the cone and coacting with said flange to make up the low speed clutch, a plate splined on the outer sleeve and having oppositely projecting flanges, one of which coacts with said cone to make up the medium speed clutch and the other of which has an inclined inner wall coacting with the conical portion of said carrier to make up the high speed clutch, a brake for the carrier, a separate brake for said plate, and manually controlled means for adjusting said plate and its flanges so as to engage the two members of the medium speed clutch or those of the high speed clutch, or to simultaneously disengage the members of both clutches.

3. In a variable speed planetary gearing, the combination with the power shaft, the driven element having a spur gear, a planet carrier comprising a casing having a conical portion constituting the inner member of the high speed clutch, a plurality of shafts in the carrier, a set of planet gears on each shaft one of which meshes with said spur gear, an inner sleeve loose on the power shaft and having a pinion meshing with the largest planet gear, and an outer sleeve loose on the inner sleeve and having a pinion meshing with the medium planet gear; of a disk fast on the inner sleeve and having a flange constituting the inner member of the low speed clutch, a disk fast on the power shaft and having a cone constituting the inner member of the medium speed clutch, a ring fast within the cone, mechanism carried by the ring and coacting with said flange to make up the low speed clutch, a plate splined on the outer sleeve and having oppositely projecting flanges, one of which has an inclined inner wall coacting with said cone to make up the medium speed clutch and the other of which has an inclined inner wall coacting with the conical portion of the casing to make up the high speed clutch and a cylindrical outer wall; a brake band surrounding the latter, a second brake band surrounding the planet casing, means for setting said brake bands independently, and manually controlled means for adjusting said plate and its flanges so as to engage the two members of the medium speed clutch or those of the high speed clutch or to simultaneously disengage the members of both clutches.

4. In a variable speed planetary gearing, the combination with the power shaft, the driven element having a spur gear, a planet gear carrier inclosing the latter, a plurality of shafts in the carrier, a set of planet gears on each shaft one of which meshes with said spur gear, an inner sleeve loose on the power shaft and having a pinion meshing with the largest planet gear, and an outer sleeve loose on the inner sleeve and having a pinion meshing with the medium planet gear; of a disk fast on the inner sleeve and having peripheral notches which are deeper at one end than at the other, a roller in each notch, yielding means forcing it normally toward the shallower end thereof, a disk fast on the power shaft and having a cone constituting the inner member of the medium speed clutch, a ring fixed within the cone and coacting with said rollers to make up the low speed clutch, a plate splined on the outer sleeve and having oppositely projecting flanges, one of which coacts with said cone to make up the medium speed clutch and the other of which forms the outer member of the high speed clutch, the casing of said carrier constituting the inner member of the latter; means for retarding the rotation of said carrier, independent means for retarding rotation of said plate, and manually controlled means for adjusting said plate and its flanges so as to engage the two members of the medium speed clutch or those of the high speed clutch, or to simultaneously disengage the members of both clutches.

5. In a variable speed planetary gearing, the combination with the power shaft, the driven element having a spur gear, a planet carrier inclosing the latter, a plurality of shafts in the carrier, a set of planet gears on each shaft, one of which meshes with said spur gear, an inner sleeve loose on the power shaft and having a pinion meshing with the largest planet gear, and a second sleeve loosely surrounding the shaft and having a pinion meshing with the medium planet gear; of a disk fast on one sleeve and having a flange provided with peripheral notches which are deeper at one end than at the other and are provided in their deeper ends with sockets, a roller disposed in each notch, a spring-pressed pin disposed in each socket and bearing the roller toward the shallower end of the notch, a disk fast on the power shaft and having a flange constituting the inner member of the medium speed clutch, a ring fixed within the flange and coacting with said rollers to make up the low speed clutch, a plate splined on the other sleeve and having oppositely projecting flanges which form the outer members of the medium and high speed clutches, the casing of said carrier constituting the inner member of the latter clutch; means for retarding the rotation of said carrier, independent means for retarding the rotation of said plate, and manually controlled means for adjusting said plate and its flanges so as to engage the two members of the medium speed clutch or those of the high speed clutch, or to simultaneously disengage the members of both clutches.

6. In a variable speed planetary gearing, the combination with the power shaft, the driven element having a spur gear, a planet carrier inclosing the latter, a plurality of shafts in the carrier, a set of planet gears on each shaft one of which meshes with said spur gear, and two sleeves loosely surrounding the power shaft and having pinions meshing respectively with the largest and medium planet gears; of a disk fast on one sleeve and having a flange, a disk fast on the power shaft and having a cone constituting the inner member of the medium speed clutch, a ring fixed within the cone, a ratchet between said flange and ring, a plate having a hollow hub splined on the other sleeve and its body provided with oppositely projecting flanges, one of which coacts with said cone to make up the medium speed clutch and the other of which forms the outer member of the high speed clutch, the casing of said carrier constituting the inner member of the latter; means for retarding the rotation of said carrier, independent means for retarding the rotation of said plate, an expansive spring coiled within said hollow hub between said carrier and plate for forcing the latter normally in one direction, and manually controlled means in opposition to said spring for adjusting said plate and its flanges so as to engage the two members of the medium speed clutch or those of the high speed clutch or to simultaneously disengage the members of both clutches.

7. In a variable speed planetary gearing, the combination with the power shaft, the driven element having a spur gear, a planet carrier inclosing the latter, a plurality of shafts in the carrier, a set of planet gears on each shaft one of which meshes with said spur gear, and a sleeve loosely surrounding the shaft and having a pinion meshing with a second planet gear; of a disk fast on the power shaft and having a cone constituting the inner member of a clutch, a plate splined on the sleeve and having oppositely projecting flanges, one of which coacts with said cone to make up said clutch and the other of which forms the outer member of the high speed clutch, the casing of said carrier constituting the inner member of the latter; means for retarding the rotation of said carrier, and manually controlled means for adjusting said plate and its flanges so as to engage the two members of either clutch, or to simultaneously disengage the members of both clutches.

8. In a variable speed planetary gearing, the combination with the power shaft, the driven element having a spur gear, a planet carrier inclosing the latter, a plurality of shafts in the carrier, a set of planet gears on each shaft one of which meshes with said spur gear, and a sleeve loosely surrounding the shaft and having a pinion meshing with a second planet gear; of a disk fast on the power shaft and having a cone constituting the inner member of a clutch, a plate having a hollow hub splined on the sleeve and its body provided with oppositely projecting flanges, one of which coacts with said cone to make up said clutch and the other of which forms the outer member of the high speed clutch, the casing of said carrier constituting the inner member of the latter; means for retarding the rotation of said carrier, an expansive spring coiled within said hollow hub between said carrier and plate for forcing the latter normally in one direction, and manually controlled means in opposition to said spring for adjusting said plate and its flanges so as to engage the two members of either clutch or to simultaneously disengage the members of both clutches.

9. In a variable speed planetary gearing, the combination with the power shaft, a planet carrier comprising a casing having a conical portion constituting the inner member of a high speed clutch, the driven element, and planet gears connected therewith and mounted within the carrier; of a sleeve loosely surrounding the shaft and having a pinion engaging one of the planet gears, a plate splined on the sleeve and having oppositely projecting flanges, one of which coacts with the conical portion of the casing to make up the high speed clutch and the other of which is internally flared to constitute the outer member of a lower speed clutch, a disk fast on the shaft and having a cone constituting the inner member of the last-named clutch, a brake for checking the rotation of said carrier, and manually controlled means for adjusting said plate and its flanges so as to engage the two members of either clutch, or to simultaneously disengage the members of both clutches.

10. In a variable speed planetary gearing, the combination with the power shaft, a planet carrier comprising a casing having a conical portion constituting the inner member of a high speed clutch, the driven element, and planet gears connected therewith and mounted within the carrier; of a sleeve loosely surrounding the shaft and having a pinion engaging one of the planet gears, a plate splined on the sleeve and having oppositely projecting flanges, one of which coacts with the conical portion of the casing to make up the high speed clutch and the other of which is internally flared to constitute the outer member of a lower speed clutch, a disk fast on the shaft and having a cone constituting the inner member of the last-named clutch, said plate having a hollow hub, an expansive spring interposed between said hub and the carrier for moving the plate in one direction, manually controlled means in opposition to said spring for adjusting the plate and its flanges so as to engage the two members of either clutch or to simultaneously disengage the members of both clutches, and means for checking the rotation of said carrier.

11. In a variable speed planetary gearing, the combination with the power shaft, a planet carrier comprising a casing having a conical portion constituting the inner member of a high speed clutch, the driven element, and planet gears connected therewith and mounted within the carrier; of a sleeve loosely surrounding the shaft and having a pinion engaging one of the planet gears, a plate splined on the sleeve and having oppositely projecting flanges, one of which coacts with the conical portion of the casing to make up the high speed clutch and the other of which is internally flared to constitute the outer member of a lower speed clutch, a disk fast on the shaft and having a cone constituting the inner member of the last-named clutch, said plate having a hollow hub, an expansive spring interposed between said hub and the carrier for moving the plate in one direction, an annular plate around said shaft and spaced from said disk with its edge resting against that of the flange of the lower speed clutch, manually controlled means for adjusting said plate toward the disk in opposition to the tension of said spring to engage the members of either clutch or disengage the members of both, and means for checking the rotation of said carrier.

12. In a variable speed transmission gearing, the combination with a power shaft, a driven element, gears and clutch mechanism adapted to connect the shaft and element so as to drive the latter at different speeds, a shifting plate mounted loosely on the shaft, connections between it and the movable members of said mechanisms, and a spring pressing said members and plate in one direction; of a collar fast on the shaft, a lever pivoted to the collar and having a head bearing against said plate so as to move it in a direction opposed to the tension of said spring, and means for manually adjusting the position of said lever.

13. In a variable speed transmission gearing, the combination with a power shaft, a driven element, gears and clutch mechanisms adapted to connect the shaft and element so as to drive the latter at different speeds, a shifting plate mounted loosely on the shaft, a wear plate in contact with the movable members of said mechanisms, anti-friction mechanism between said plates, and a spring pressing said members and plates in one direction; of a collar fast on the shaft, a lever pivoted to the collar and having a head bearing against said shifting plate so as to move it in a direction opposed to the tension of said spring, a two-step cone mounted slidably on the shaft with its face adjacent the outer arm of said lever, and manually operated means for adjusting the position of said cone.

In testimony whereof I have hereunto set my hand in presence of two subscribing witnesses.

EMIL GNOETH.

Witnesses:
LEONARD W. HANSON,
HERMAN HOWIND.